United States Patent [19]
Hollis

[11] 3,993,978
[45] Nov. 23, 1976

[54] SOLID STATE CROSSPOINT CIRCUIT ARRANGEMENT FOR USE IN A TELEPHONE EXCHANGE

[75] Inventor: John Edward Hollis, High Wycombe, England

[73] Assignee: Plessey Handel und Investments AG., Ilford, England

[22] Filed: Sept. 26, 1974

[21] Appl. No.: 509,473

[30] Foreign Application Priority Data
Oct. 2, 1973   United Kingdom............... 45881/73

[52] U.S. Cl.......................... 340/166 R; 179/18 GF
[51] Int. Cl.² ........................................... H04Q 3/50
[58] Field of Search............. 340/166 R; 179/18 GF; 307/242

[56] References Cited
UNITED STATES PATENTS

| | | | |
|---|---|---|---|
| 3,655,920 | 4/1972 | Laane | 340/166 X |
| 3,715,732 | 2/1973 | Lynes | 340/166 X |
| 3,720,792 | 3/1973 | Resta | 340/166 X |
| 3,789,151 | 1/1974 | Richards | 179/18 GF |
| 3,826,873 | 7/1974 | Susi | 179/18 GF |

Primary Examiner—Harold I. Pitts
Attorney, Agent, or Firm—Fleit & Jacobson

[57] ABSTRACT

A solid state crosspoint arrangement comprises a pair of transistors arranged in current driven common base configuration, the emitters and collectors of said transistors constituting inputs and outputs respectively of said arrangement. Preferably the crosspoint arrangement will form part of a self-steering crosspoint matrix.

12 Claims, 4 Drawing Figures

SOLID STATE CROSSPOINT CIRCUIT ARRANGEMENT FOR USE IN A TELEPHONE EXCHANGE

BACKGROUND OF THE INVENTION

This invention relates to solid state circuits and relates more particularly to solid state crosspoint circuit arrangements for use in telephone exchanges and to telephone exchanges incorporating such solid state crosspoint circuit arrangements.

Up to the present time the use of solid state techniques within the switchblock (the interconnection field) of a telephone exchange have been limited, in the main, to arrangements that are akin to reed relay approaches, the most popular being based on a P.N.P.N. diode (silicon controlled rectifier — SCR) crosspoint. The SCR crosspoint however, suffers from the disadvantages that, because of its ON resitance it is marginal as regards exchange insertion loss and also it suffers from cross-talk problems.

SUMMARY OF THE INVENTION

According to the first aspect of the present invention there is provided a solid state crosspoint circuit arrangement comprising first and second transistor means which are arranged to operate in their linear region in current driven, common base configuration, the emitter electrodes of said transistors affording inputs to said arrangement and the collector electrodes of said transistors affording outputs of said arrangement.

In carrying out the invention according to the first aspect thereof a memory device may be provided, preferably in the form of a silicon controlled rectifier memory, capable of being set in an ON or OFF state for providing bias to the first and second transistors and memory trigger means for setting the state of the memory device.

Conveniently the silicon controlled rectifier memory may be constituted by a PNP transistor and a NPN transistor, the collector electrode of the PNP transistor being connected to the base electrode of the NPN transistor, and the collector electrode of the NPN transistor being connected to the base electrode of the PNP transistors and via resistor means to the emitter electrode of the PNP transistors, the collector electrode of the NPN transistor constituting the trigger electrode of said memory in which case the first and second transistor means are each constituted by an NPN transistor, the base electrodes thereof being connected together and connected to the emitter electrode of the NPN transistor of the silicon controlled rectifier memory, the emitter electrode of the PNP transistor of said memory being connected to a supply voltage and the collector electrode of the NPN transistor of said memory being connected to the memory trigger means.

According to a second aspect of the present invention there is provided a crosspoint matrix arrangement comprising a matrix array of solid state crosspoint circuit arrangements said crosspoint circuit arrnagements being electrically interconnected in rows and in columns, the emitter electrodes of the first transistor means of the said crosspoint circuit arrangements of each row being interconnected, the collector electrodes of the second transistor means of the said crosspoint circuit arrangements of each row being interconnected, the emitter electrodes of the second transistor means of the said crosspoint circuit arrangements of each column being interconnected and the collector electrodes of the first transistor means of the said crosspoint circuit arrangement of each column being interconnected.

In carrying out the invention according to the second aspect thereof, voltage level translater means may be provided associated with each row and with each column of said matrix arrangement, the voltage level translator means being connected in series with the collector electrodes of the first or second transistor means.

Conveniently mark detector means may be provided associated with the emitter electrodes of the first transistor means of the crosspoint circuit arrangements of each row of said matrix arrangement and means is included for providing a current path for the memory trigger means of said row and for causing mark generator means associated with the collector electrodes of the first transistor means of the said crosspoint circuit arrangements of each column of said matrix arrangement to be activated, in which case mark generator inhibitor means may be provided, associated with each of the mark generator means for inhibiting the activation thereof if any one of the crosspoint circuit arrangements of the associated column of said matrix arrangement is biased ON.

Current detector means may also be provided associated with each of the voltage level translator means of each column of said matrix arrangement, for connecting a supply voltage to the silicon controlled rectifier memories of the crosspoint circuit arrangements of the associated column.

According to a thrid aspect of the present invention there is provided a telephone exchange comrising a plurality of crosspoint matric arrangements in accordance with the second aspect of the invention, connected in the form of a switchblock, the switchblock conveniently consisting of a plurality of states, each stage of the switchblock including a plurality of crosspoint matix arrangements, the crosspoint matrix arrangements of the stages of said exchange being interconnected in "mushroom" configuration.

In carrying out the invention according to the third aspect thereof, there may be provided a telephone exchange, a plurality of subscribers lines, each of which is connected to a line and hybrid unit individual thereto, the outputs of the line and the hybrid units being connected to the switchblock the output from which is applied to re-entry switch means forming part of said exchange, and central control means may be provided for controlling the operation of the line and hybrid unit and the re-entry switch means.

BRIEF DESCRIPTION OF THE DRAWINGS

An exemplary embodiment of the invention will now be described reference being made to the accompanying drawings, in which.

DESCRIPTION OF THE PREFERRED EMBODIMENT

Figure 1:
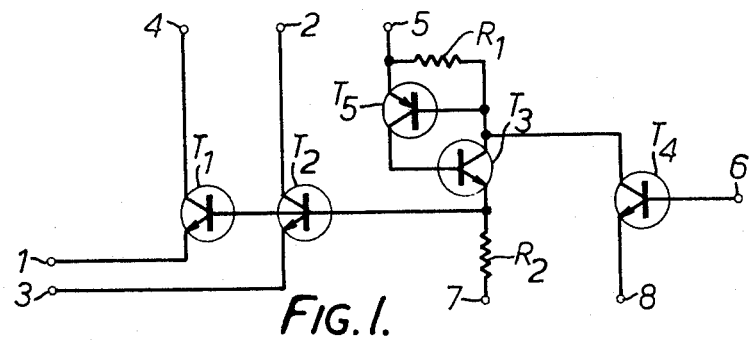
FIG. 1 is a circuit diagram of a solid state crosspoint circuit arrangement according to the present invention.

The basic switchblock crosspoint of the present invention is shown in FIG. 1 and consists of two transistors $T_1$ and $T_2$ which constitute the crosspoint proper, the transistors $T_1$ and $T_2$ being operated in their linear, i.e., non-saturated region, in current driven, common base configuration, such that the emitter electrodes thereof constitute, via terminals 1 and 3 respectively, the signal input to the crosspoint the signal output from the crosspoint being derived from the collector electrodes of the transistors $T_1$ and $T_2$ via terminals 4 and 2 respectively. The transistors $T_1$ and $T_2$ are arranged to be normally OFF and are caused to be biased into their ON state by means of an SCR type memory element constituted by NPN transistor $T_3$ and PNP transistors $T_5$ which when triggered into their ON state provide base bias to the crosspoint transistors $T_1$ and $T_2$ thereby causing them to be turned ON. The transistors $T_3$ and $T_5$ are supplied with supply current via input terminal 5 and are themselves triggered into conduction by means of a further NPN transistor $T_4$, the base electrode of which is connected to input terminal 6 and the emitter electrode of which is connected to input terminal 8.

Conventional solid state switchblock exchanges are based on a balanced two-wire system requiring the bidirectional switch paths in each crosspoint. In the crosspoint according to the present invention the switch paths afforded by the crosspoint transistors $T_1$ and $T_2$ are monodirectional thereby constituting four-wire switching arrangement. In order to avoid switching four physical wires, it is proposed in a telephone exchange according to the present invention to make use of unbalanced transmission techniques thereby requiring that each subscribers line be provided with a hybrid unit for converting the two-wire balanced system into a four-wire unbalanced system. This aspect will be further described in connection with the telephone exchange of FIG. 3. Normally, the use of unbalanced transmission gives rise to cross-talk problems, but this can be reduced to a minimum by making use of the crosspoint of FIG. 1 in which the signal is applied to a crosspoint transistors emitter electrode so that the termination impedance to unbalanced inter-switch stage wiring capacitance is low. Capacitive cross-talk will therefore be small as will inductive cross-talk since the crosspoint transistors collector output will be a current source and will afford a high circuit impedance.

Figure 2A:
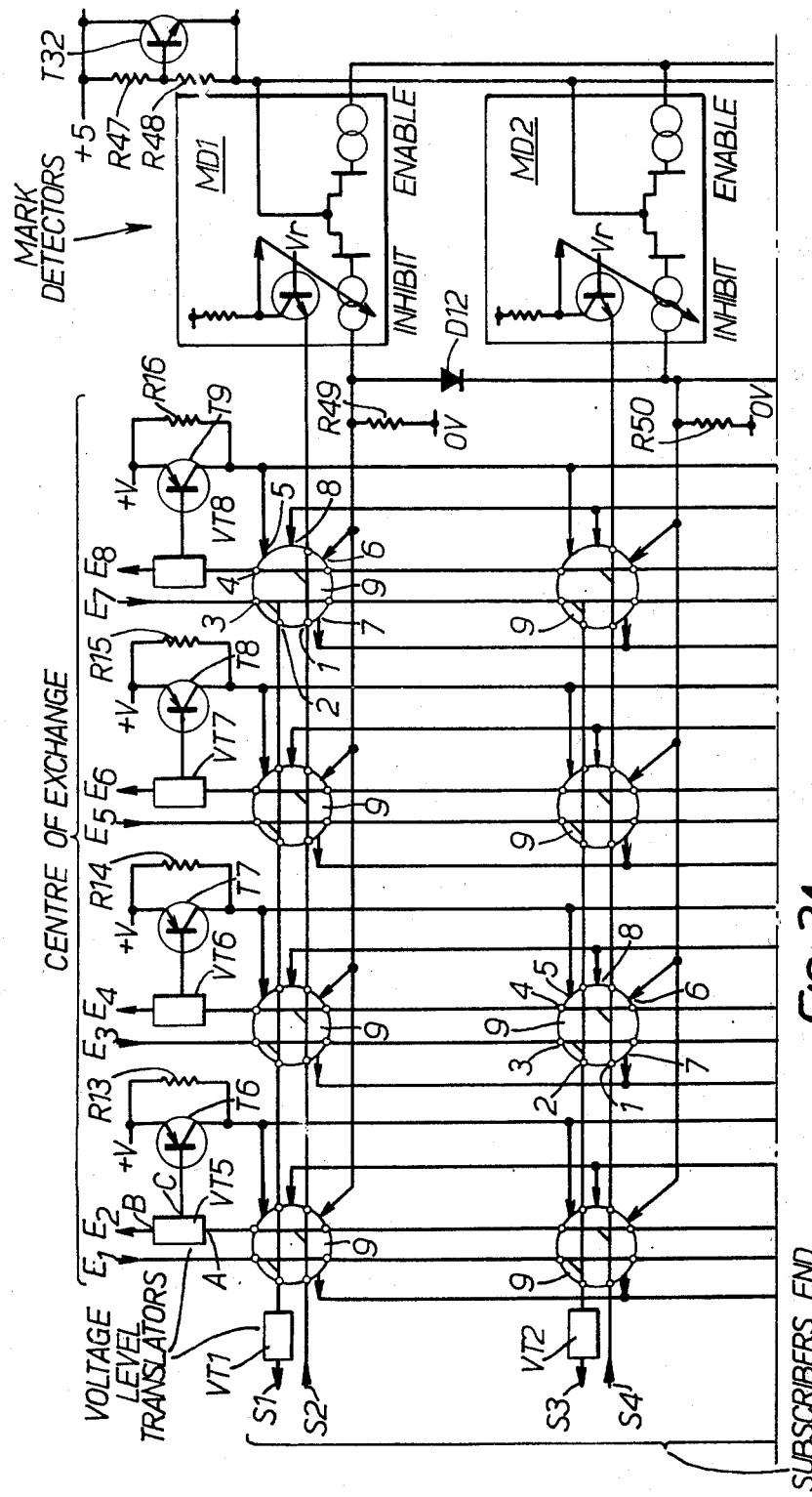
FIG. 2A and 2B are a partially block schematic diagram of a current steering crosspoint matrix based on the solid state crosspoint circuit arrangement of FIG. 1.
Figure 2B:
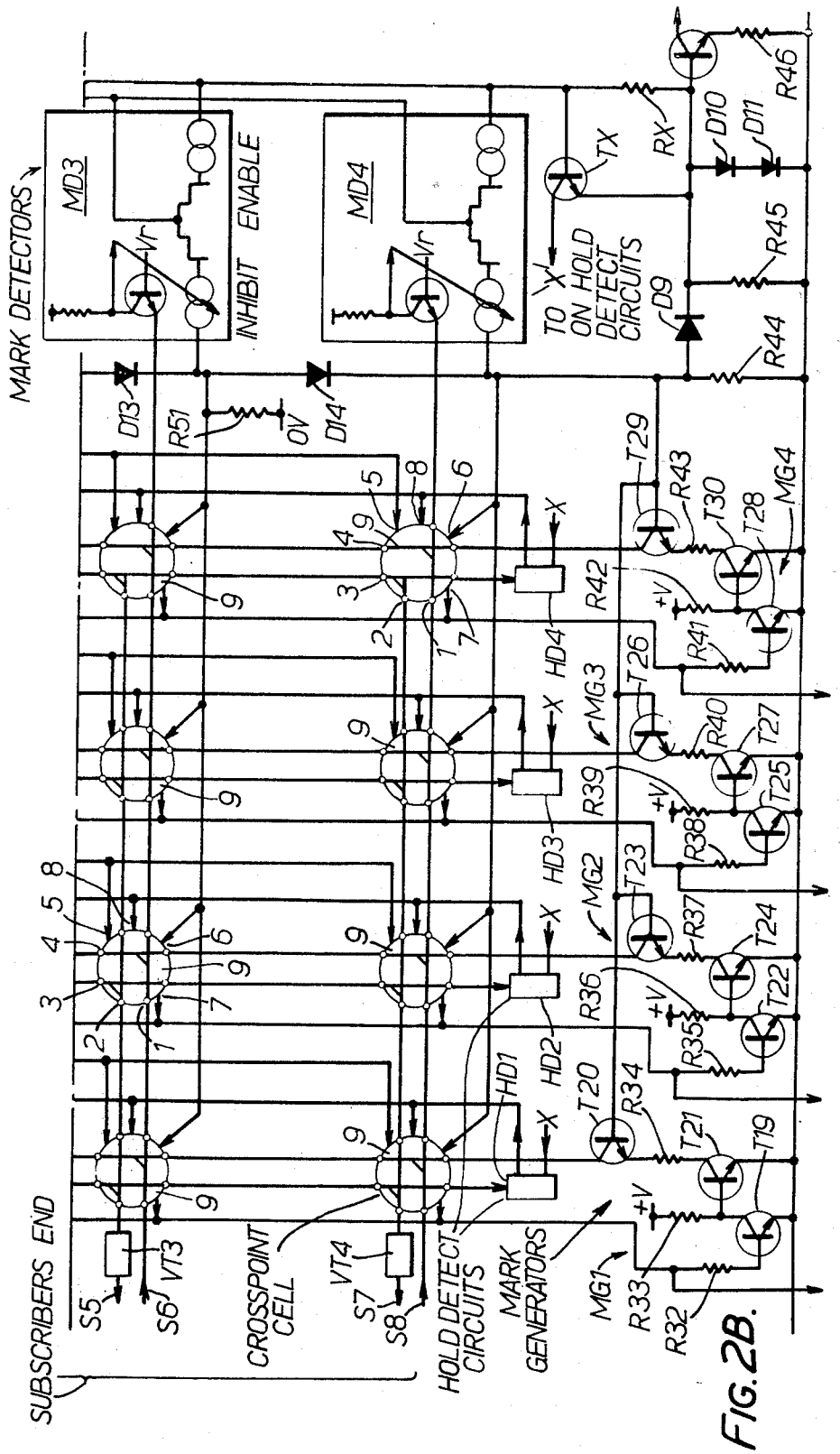

In FIG. 2 of the drawings there is shown a current steering crosspoint matrix incorporating a 4 × 4 array of the crosspoints of FIG. 1, the matrix forming part of the switchblock of a telephone exchange to be described in connection with FIG. 3 of the drawings. In the crosspoint matrix of FIG. 2, the crosspoints are shown schematically at 9 the terminal connections 1 to 8 as described with reference to FIG. 1 being shown. The input terminals 1 of each row of crosspoints 9 are connected together to afford subscribers line inputs $S_2$, $S_4$, $S_6$ and $S_8$ and the output terminals 2 of each row of crosspoints 9 are connected together to afford, via voltage level translators $VT_1$, $VT_2$, $VT_3$ and $VT_4$ respectively, which will be referred to later, subscribers line outputs $S_1$, $S_3$, $S_5$ and $S_7$. Similarly, the input terminals 3 of each column of crosspoints 9 are connected together to afford exchange inputs $E_1$, $E_3$, $E_5$ and $E_7$ and the input terminals 4 of each column of crosspoints 9 to afford, via voltage level translators, $VT_5$, $VT_6$, $VT_7$ and $VT_8$ respectively which will also be referred to later, exchange output outputs $E_2$, $E_4$, $E_6$ and $E_8$.

Figure 3:
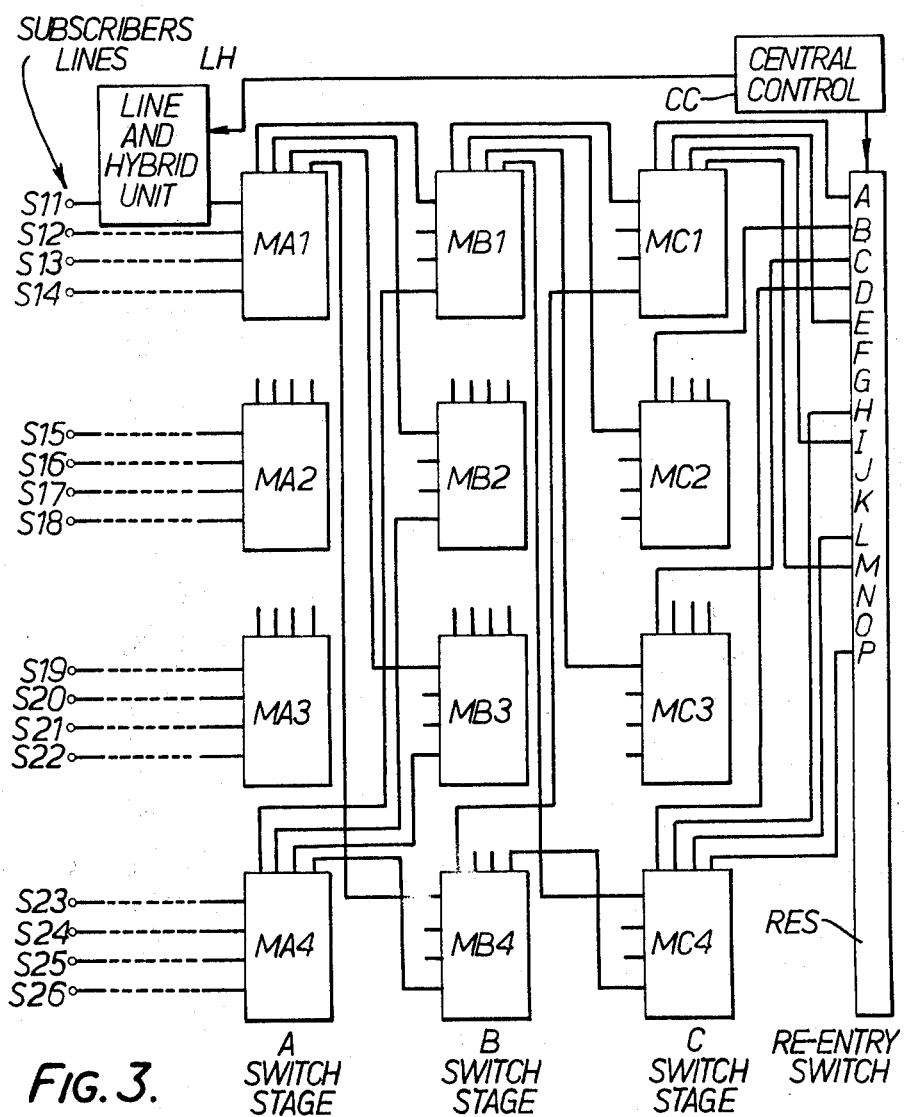
FIG. 3 is a block schematic diagram of a telephone exchange according to the present invention based on the current steering crosspoint matrix of FIG. 2.

Before describing the matrix arrangement of FIG. 2 further it is convenient to consider the block schematic diagram of a telephone exchange depicted to FIG. 3 of the drawings, the switchblock of which makes use of a number of matrix arrangements of FIG. 2. The telephone exchange of FIG. 3 comprises a three stage switchblock, the stages A, B and C of which each consist of four matrix arrangements reference MA1 to MA4, MB1 to MB4 and MC1 to MC4 respectively. Each of the matrix arrays is provided with four subscribers inputs which are depicted down the left-hand side of each block and four exchange outputs which are depicted along the top of each block. It should be appreciated that each of the subscribers inputs and exchange outputs of the matrix arrangements should include and input line and an output line as described in the arrangement of FIG. 2, whereas only a single line is depicted in FIG. 3. The subscribers inputs of the matrices of the A switch stage are connected to subscribers lines $S_{11}$ to $S_{16}$ respectively via combined line and hybrid units LH only one of which is shown. The exchange outputs of the A switch stage are connected to the B switch stage in a mushroom configuration such that the four exchange outputs of the matrix MA1 are connected to one subscribers input respectively of each of the matrices MB1 to MB4 of the B switch stage, the four exchange outputs of the matrix MA2 are connected to one subscribers input respectively of each of the matrices MB1 to MB4 etc. Similarly, the exchange outputs of the B switch stage are connected to the subscribers inputs of the C switch stage. The exchange outputs of the C switch stage are connected to inputs A to P of a re-entry switch RES which is effective for connecting pairs of the inputs applied thereto together under the control of a central control CC. Since each of the lines applied to the re-entry switch RES is in fact an input wire and an output wire, the connecting switches within the re-entry switch RES are in fact dual switches. An output from the central control is also applied to the line and hybrid units LH connected to each of the subscribers lines $S_{11}$ to $S_{26}$.

The setting up of a switch path between a calling subscriber say on subscriber lines $S_{12}$ and a called subscriber say on subscriber line $S_{23}$ is effected in the stages. Firstly a switch path between the calling subscriber line $S_{12}$ to the re-entry switch RES is set up and them a switch path between the re-entry switch RES and the called subscriber line $S_{23}$ is set up. The switch path between the calling subscriber line $S_{12}$ and the re-entry switch RES is set up using the technique of "end mark self-steer" by causing the line and hybrid unit LH associated with the calling subscriber line $S_{12}$ to send, under the control of the central control CC, a mark current into matrix MA1 of the A switch stage. The matrix MA1 is designed so that when a mark signal is received on any of its subscriber inputs all of its exchange outputs that are not in use are caused to send a forward mark signal which are applied to the matrices of the B switch stage. Each of the B stage matrices that receive a forward mark signal from the matrix MA1 will then generate their own forward mark signals on any 'free' outputs, these being fed to the matrices of the C stage switch. Similarly each of the matrices of the C stage switch that receive a forward mark signal from the B stage switch will generate forward mark signals on any free outputs, these being fed to the re-entry crosspoint 9 can be set when a hold signal is returned. Such a process continues in all stages of switching until marks are presented at the re-entry switches RES from the last switch stage. At the latter switch stages it cannot be guaranteed that only one mark be received in a 4 × 4 matrix and there is therefore the possibility of several rows of crosspoints 9 being biased up and selected upon subsequent receipt of a hold current. To avoid this the diode bias chain D12, D13 and D14 form a priority system in that the row of marked crosspoints 9 at the top of the matrix have priority over the lower ones. This priority is achieved because the S.C.R. trigger devices of the crosspoints 9 within a column operate in common emitter mode. Therefore, the transistor with the highest base bias will hog the 'hold' current and fire only one crosspoint S.C.R memory transistor $T_4$ (FIG. 1).

When a particular input of the re-entry switch RES (FIG. 3) is selected a single hold current is passed back into the switchblock along for example, input $E_7$ of the matrix. Ths hold current will be detected by a hold detect circuit HD4 which will generate a current and inject it into the inputs 8 of the crosspoints 9 of that column causing the S.C.R. trigger transistors to fire a single crosspoint 9. The crosspoint 9, so selected, will turn off the mark detector $MD_1$ associated with the row of crosspoints containing the set crosspoint 9 and the appropriate hold detector HD4 by biasing the crosspoint transistors' bases higher than those at the detectors' input. The mark forward current will thus be handled by the selected crosspoint 9 and passed on to the appropriate voltage level translator $VT_5$, $VT_6$, $VT_7$ or $VT_8$ to maintain the S.C.R. power supply transistor ($T_6$, $T_7$, $T_8$ or $T_9$) ON. The hold current will also be handled by the selected crosspoint 9 passing on the single 'hold' to the next stage of switching via the output voltage level translator $VT_1$, $VT_2$, $VT_3$ or $VT_4$.

Eventually all switch stages of the arrangement of FIG. 3 will have a crosspoint selected, the line units mark/bias current will then be handled by every crosspoint in the forward direction and the re-entry switches hold current in the reverse direction. When once the path has been set up, however, the hold current can be made zero as it has no further path control functions.

It will be appreciated that the 4 × 4 crosspoint matrix of FIG. 2 has been described by way of example only and a matrix having any convenient number of crosspoints may be used utilising the principles described. Also, the basic 4 × 4 crosspoint matrix of FIG. 2 may be used as a sub-unit of a larger matrix, for example an 8 × 8 matrix may be obtained by using four 4 × 4 matrices.

What we claim is:

1. A solid state crosspoint comprising first and second transistor means each arranged to operate in its linear region, each of said transistors having an emitter electrode, a collector electrode and a base electrode, the emitter electrodes affording inputs to said crosspoint and the collector electrodes affording outputs of said crosspoint and bias means connected to the base electrodes of the first and second transistors for causing them to be biased so that they operate in current driven, common base configuration.

2. A crosspoint according to claim 1, in which the bias means is a memory device having ON and OFF states and in which memory trigger means is provided for setting the state of said memory device.

3. A crosspoint according to claim 2, in which the memory device takes the form of a silicon controlled rectifier memory.

4. A crosspoint according to claim 3, in which the silicon controlled rectifier memory is constituted by a PNP transistor and an NPN transistor, the collector electrode of the PNP transistor being connected to the base electrode of the NPN transistor, and the collector electrode of the NPN transistor being connected to the base electrode of the PNP transistor and via resistor means to the emitter electrode of the PNP transistor, the collector electrode of the NPN transistor constituting the trigger electrode of said memory.

5. A crosspoint according to claim 4, in which the first and second transistor means are each constituted by a NPN transistor, the base electrodes thereof being connected together and connected to the emitter electrode of the NPN transistor of the silicon controlled rectifier memory, the emitter electrode of the PNP transistor of said memory being connected to a supply voltage and the collector electrode of the NPN transistor of said memory being connected to the memory trigger means.

6. A crosspoint matrix arrangement comprising a matrix array of solid state crosspoints according to claim 1, said crosspoints being electrically interconnected in rows and in columns, the emitter electrodes of the first transistor means of the said crosspoints of each row being interconnected, the collector electrodes of the second transistor means of the said crosspoints of each row being interconnected, the emitter electrodes of the second transistor means of the said crosspoints of each column being interconnected and the collector electrodes of the first transistor means of the said crosspoints of each column being interconnected.

7. A crosspoint matrix arrangement according to claim 6, comprising voltage level translator means associated with each row and with each column of said matrix arrangement, the voltage level translator means being connected in series with the collector electrodes of the first or second transistor means.

8. A crosspoint matrix arrangement according to claim 6, in which mark detector means is provided associated with the emitter electrodes of the first transistor means of the crosspoints of each row of said matrix arrangement and means is included for providing a current path for the bias means of said row and for causing mark generator means associated with the collector electrodes of the first transistor means of the said crosspoints of each column of said matrix arrangement to be activated.

9. A crosspoint matrix arrangement according to claim 8, in which mark generator inhibitor means is provided associated with each of the mark generator means for inhibiting the activation thereof if any one of the crosspoints of the associated column of said matrix arrangement is biased ON.

10. A crosspoint matrix arrangement according to claim 7, in which current detector means is provided associated with each of the voltage level translator means of each column of said matrix arrangement, for connecting a supply voltage to the silicon controlled rectifier memories of the crosspoints of the associated column.

11. A plurality of crosspoint matrix arrangements according to claim 6 connected in the form of a switchblock.

12. A switchblock according to claim 11, comprising a plurality of stages, each stage of the switchblock including a plurality of crosspoint matrix arrangements which are interconnected in 'mushroom' configuration.

* * * * * switch RES. Thus from a single injected mark every possible switch path to the re-entry switch RES is indicated. The next part of the path set up is the selection by the central control CC of a single marked path and is started by selecting one re-entry switch that has been marked — say re-entry switch A. A single hold signal is then passed back from the re-entry switch RES via the input A into the matrix MC1 of the C switch stage. Within the matrix MC1 the hold signal will intersect with marked forward paths from the B switch stage, thereby indicating the crosspoints that can be set to connect the switch path. Only one crosspoint is required to be set and suitable circuitry is used to organise which crosspoint is selected. The selected crosspoint will then be set and that crosspoint will carry the single hold signal back into the B switch stage again causing a signal crosspoint to be selected. This crosspoint will carry the single hold signal back into the A switch stage where one crosspoint will also be selected so that a switch path will be set up using a single crosspoint in each switch stage between the line and hybrid unit associated with calling subscriber line $S_{12}$ and the input A of the re-entry switch RES. The unused marked paths will be cancelled.

The switch path set up between the re-entry unit RES and the called subscriber line $S_{23}$ is similar to that described above except that this time a marked path must be set up between the line and hybrid unit LH associated with the called subscriber line $S_{23}$ and a part of the re-entry switch RES that 'mates' with the input A already selected. Let it be assumed that the re-entry switch RES provides a dual switch facility between the already selected input A and the input B then the switch path set up between the calling subscriber line $S_{23}$ and the re-entry switch RES must reach the input B. In general this should cause no problem because of the many diverse paths available but if blocking does become intolerable an extra expansion switch stage D (not shown) may be inserted between the C switch stage and the re-entry switch RES to handle the second part of the switch path set up.

Having set up the required path between the calling subscriber line $S_{12}$ and the called subscriber line $S_{23}$, the forward mark signal from one section of the switch path becomes the single hold signal for the other switch path and vice versa. Modulation of these signals in sympathy with the telephone line input signals thereby allows conversation over the switch path.

Path clear down may be achieved by arranging that either the hold signal or mark signal is cancelled but in realizing an autonomously controlled solid state crosspoint matrix it is more convenient to clear the path by cancelling the mark signal at the line and hybrid unit.

As has been described with reference to the crosspoint arrangement of FIG. 1, it is essential that the crosspoint transistors be biased in their linear region. Now, the mark signals generated by the line and hybrid units LH and the hold signals generated by the re-entry switch RES of the arrangement of FIG. 3 would conveniently be generated with respect to 0V. Thus to ensure that saturation effects are avoided the crosspoint transistor in the A switch stage passing the mark signal would need to be biased relative to 2V, the crosspoint transistor in the B stage matrix 4V and the crosspoint transistor in the C stage matrix 6V. Similarly, the crosspoint transistor in the C stage matrix passing the hold signal would need to be biased relative to 2V, the crosspoint in the B stage matrix 4V and the A stage matrix 6V. Within strict limitations such variations in bias could be acceptable in that the appropriate biases could be set up. However, when one considers mass producing exchanges and large scale integration (L.S.I.) of crosspoint matrices the per stage and direction of signal transmission bias conditions are very unattractive. This is particularly so in the case of L.S.I. for cost advantages rely upon a large through-put of identical items. The conflicting biasing requirements of the two transistors forming a cell are then such that it may be impractical to make a crosspoint array.

To overcome these features and thereby allow a standard crosspoint L.S.I. chip to be realized, it is necessary to buffer each switch stage and current drive/sink each one identically and relatively to zero volts. Each crosspoint array output therefore has associated with it a buffer circuit which in this paper is termed a voltage level translator (V.L.T.). Each V.L.T. circuit being capable of sourcing current, relative to +V supply, for its associated crosspoints and mirroring it relative to zero volts as a sink for the subsequent switching stage crosspoint.

Having now discussed the operation of the overall system, it is convenient to consider the operation of the crosspoint matrix of FIG. 2 in greater detail.

A mark input applied to any of the subscriber inputs $S_2$, $S_4$, $S_6$ or $S_8$ will be detected by a corresponding mark detector $MD_1$, $MD_2$, $MD_3$ or $MD_4$, causing it to inject current into a diode chain formed by diodes D12, D13 and D14, and will also provide base bias for the inputs 6 of the crosspoints 9 associated with the marked input. The injected current will also generate bias across diodes D9, D10, and D11 allowing four mark generator circuits $MG_1$, $MG_2$, $MF_3$ and $MG_4$ in the form of current sink circuits, to operate and pass on the marks. If some of the crosspoints 9 are selected all four mark forward generators $MG_1$, $MG_2$, $MG_3$ and $MG_4$ will operate. If, however, a particular one or more of the crosspoints 9 is ON the mark forward would be inhibited by, for example, transistor T28 being biased ON and turning transistor T30 off. Any interference with an established call will therefore be minimal. The bias for transistor T28 is from an ON S.C.R. via current limit resistor R2 of FIG. 1.

The regenerated mark currents are also handled by the voltage level translators $VT_5$, $VT_6$, $VT_7$ and $VT_8$ before being passed on to the next switching stage and a signal is extracted to indicate that 'current is being handled'. This signal biases on the normally OFF transistor T6 (or T7 or T8 or T9 depending upon the output considered) and provides power supply type bias to the input 5 of the crosspoints 9 associated with that output. At this time the S.C.R. memory within the crosspoints 9 are off as no current is present in the emitter circuit of the memory trigger transistor $T_4$ (FIG. 1) to allow firing of the S.C.R. (It will be noted that a resistor $R_{13}$ (etc.) is in parallel with the transistor $T_6$ (etc.), this is used to eliminate 'rate effect firing' of the S.C.R., i.e. when $T_6$ etc. is off the potential across the S.C.R. would be zero volts if $R_{13}$ was absent. Turning on the transistor would then cause the potential across the S.C.R. to rise to +V (+5V) and possibly fire the S.C.R. The resistors, similar to $R_{13}$, prevent this in that they do not provide sufficient bias to hold the S.C.R. on but to hold the potential at near +V, turning transistor $T_9$, etc., on will not then cause any substantial voltage changes).

From one mark input, therefore, several marks are forwarded and bias conditions arranged such that a